(12) United States Patent
Chhabra

(10) Patent No.: US 8,682,351 B1
(45) Date of Patent: *Mar. 25, 2014

(54) METHOD AND APPARATUS FOR LOCATING A WLAN STATION BASED ON A PROPAGATION DELAY OF A SIGNAL

(71) Applicant: Marvell International Ltd., Hamilton (BM)

(72) Inventor: Kapil Chhabra, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/741,607

(22) Filed: Jan. 15, 2013

Related U.S. Application Data

(63) Continuation of application No. 13/204,262, filed on Aug. 5, 2011, now Pat. No. 8,355,739, which is a continuation of application No. 13/013,500, filed on Jan. 25, 2011, now Pat. No. 7,996,020, which is a continuation of application No. 12/006,085, filed on Dec. 28, 2007, now Pat. No. 7,877,101.

(60) Provisional application No. 60/882,246, filed on Dec. 28, 2006.

(51) Int. Cl.
*H04W 24/00* (2009.01)

(52) U.S. Cl.
USPC ........... 455/456.3; 455/456.1; 455/456.5; 455/456.6; 455/41.2; 455/67.11; 455/67.16; 455/507; 455/513; 455/561; 709/224; 709/238; 709/239; 370/236; 370/237; 370/238; 342/118; 342/126; 342/450; 342/453; 342/458

(58) Field of Classification Search
USPC ......... 455/456.1–456.6, 457, 67.11, 67.16, 455/67.13, 41.2, 500, 507–514, 561; 342/118, 126, 127, 450, 453, 458; 709/223, 224, 238–244; 370/229, 236, 370/237, 238, 503, 508
See application file for complete search history.

(56) References Cited

U.S. PATENT DOCUMENTS 5,509,074 A 4/1996 Choudhury et al.
5,903,844 A * 5/1999 Bruckert et al. ........... 455/456.2

(Continued)

FOREIGN PATENT DOCUMENTS

EP 1 187 391 3/2002
EP 1 408 497 4/2004

(Continued)

OTHER PUBLICATIONS

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; Aug. 20, 1999; 531 pages.

(Continued)

*Primary Examiner* — Tuan A Tran

(57) ABSTRACT

A system including a first wireless device and a second wireless network device. The first wireless network device is configured to transmit a data frame a first number of times, wherein the first number of times is determined based on a timing resolution associated with the first wireless network device, receive a respective acknowledgement frame in response to each transmission of the data frame, determine an accumulated delay period corresponding to a total time between each transmission of the data frame and reception of the respective acknowledgement frame, and calculate a distance between the first wireless network device and the second wireless network device based on the accumulated delay period and the first number of times. The second wireless network device is configured to receive each transmission of the data frame and transmit the respective acknowledgement frame in response to each transmission of the data frame.

16 Claims, 11 Drawing Sheets

(56) References Cited

U.S. PATENT DOCUMENTS

| | | | |
|---|---|---|---|
| 5,960,355 A * | 9/1999 | Ekman et al. | 455/456.1 |
| 6,178,432 B1 | 1/2001 | Cook et al. | |
| 6,205,471 B1 | 3/2001 | Gilchrist et al. | |
| 6,363,357 B1 | 3/2002 | Rosenberg et al. | |
| 6,460,163 B1 | 10/2002 | Bowman et al. | |
| 6,606,643 B1 | 8/2003 | Emens et al. | |
| 6,678,226 B2 | 1/2004 | Horibata et al. | |
| 6,834,110 B1 | 12/2004 | Marconcini et al. | |
| 6,847,950 B1 | 1/2005 | Kamibayashi et al. | |
| 7,058,414 B1 | 6/2006 | Rofheart et al. | |
| 7,069,025 B2 * | 6/2006 | Goren et al. | 455/456.2 |
| 7,117,392 B2 | 10/2006 | Lee | |
| 7,143,445 B1 | 11/2006 | Ishiguro et al. | |
| 7,185,257 B2 * | 2/2007 | Kim et al. | 714/751 |
| 7,191,216 B2 | 3/2007 | Mattila et al. | |
| 7,250,906 B2 * | 7/2007 | Goren et al. | 342/387 |
| 7,260,408 B2 * | 8/2007 | Friday et al. | 455/456.1 |
| 7,293,066 B1 | 11/2007 | Day | |
| 7,305,484 B2 | 12/2007 | Munetsugu et al. | |
| 7,389,273 B2 | 6/2008 | Irwin et al. | |
| 7,395,245 B2 | 7/2008 | Okamoto et al. | |
| 7,483,412 B2 * | 1/2009 | Abhishek et al. | 370/338 |
| 7,506,036 B1 * | 3/2009 | Cook | 709/220 |
| 7,552,340 B2 | 6/2009 | Ooi et al. | |
| 7,574,492 B2 * | 8/2009 | Karaoguz et al. | 709/221 |
| 7,627,329 B2 * | 12/2009 | Mizugaki et al. | 455/456.1 |
| 7,683,835 B2 * | 3/2010 | Sharma | 342/458 |
| 2002/0049717 A1 | 4/2002 | Routtenberg | |
| 2002/0093937 A1* | 7/2002 | Kim et al. | 370/349 |
| 2002/0099950 A1 | 7/2002 | Smith | |
| 2002/0103964 A1 | 8/2002 | Igari | |
| 2003/0039240 A1 | 2/2003 | Sutanto | |
| 2003/0198258 A1* | 10/2003 | Jarske | 370/519 |
| 2003/0231593 A1 | 12/2003 | Bauman et al. | |
| 2003/0236865 A1 | 12/2003 | Anthe et al. | |
| 2004/0117440 A1 | 6/2004 | Singer | |
| 2004/0213273 A1 | 10/2004 | Ma | |
| 2004/0213408 A1 | 10/2004 | Kim et al. | |
| 2005/0050327 A1 | 3/2005 | Okamoto | |
| 2005/0114647 A1 | 5/2005 | Epstein | |
| 2005/0124319 A1 | 6/2005 | Williams et al. | |
| 2006/0007863 A1* | 1/2006 | Naghian | 370/238 |
| 2006/0095331 A1 | 5/2006 | O'Malley et al. | |
| 2007/0136440 A1 | 6/2007 | Sutardja | |
| 2007/0162573 A1 | 7/2007 | Sutardja | |
| 2007/0198689 A1 | 8/2007 | Sutardja | |
| 2008/0291883 A1* | 11/2008 | Seok | 370/338 |
| 2009/0006418 A1 | 1/2009 | O'Malley | |
| 2009/0240940 A1* | 9/2009 | Shoemake et al. | 713/168 |
| 2009/0270042 A1* | 10/2009 | Miscopein et al. | 455/67.11 |

FOREIGN PATENT DOCUMENTS

| | | |
|---|---|---|
| EP | 1 439 697 | 7/2004 |
| WO | WO 03/075570 | 9/2003 |

OTHER PUBLICATIONS

IEEE 802.11 n; IEEE 802.11-04/0889r6; IEEE P802.11 Wireless LANs; TGn Sync Proposal Technical Specification; Syed Aon Mujtaba; Agere Systems Inc.; May 18, 2005; 131 pages.

IEEE 802.20-PD-06; IEEE P 802.20™ V14; Jul. 16, 2004; Draft 802.20 Permanent Document; System Requirements for IEEE 802.20 Mobile Broadband Wireless Access Systems—Version 14; 24 pages.

IEEE P802.11gID8.2, Apr. 2003 (Supplement to ANSIIEEE Std 802.11-1999(Reaff 2003)); Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

IEEE Std 802.11 a-1999 (Supplement to IEEE Std 802.11-1999); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHz Band; LAN/MAN Standards Committee of the IEEE Computer Society; Sep. 16, 1999; 91 pages.

IEEE Std 802.11 b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE Std 802.11 h™-2003 [Amendment to IEEE Std 802.1 pM, 1999 Edition (Reaff 2003) as amended by IEEE Stds 802.11a™-1999, 802.11b™-1999, 802.11b™-1999/Cor 1-2001, 802.11 d™-2001, 802.11g™_2003]; IEEE Standard for Information technology—Telecommunications and information exchange between systems—Local and metropolitan area networks—Specific requirements; Part 11: Wireless LAN Medium Access Control (MAC) and Physical Layer (PHY) specifications; Amendment 5: Spectrum and Transmit Power Management Extensions in the 5 GHz band in Europe; IEEE Computer Society; LAN/MAN Standards Committee; Oct. 14, 2003; 75 pages.

IEEE Std 802.16-2001 1M; IEE Standard for Local and metropolitan area networks; Part 16: Air Interface for Fixed Broadband Wireless Access Systems; IEEE Computer Society and the IEEE Microwave Theory and Techniquest Society; Sponsored by the LAN/MAN Standards Committee; Apr. 8, 2002; 349 pages.

IEEE Std 802.16-2004 (Revision of IEEE Std 802.16-2001) IEE Standard for Local and metropolitan area networks; Part 16: Air Interface for Fixed Broadband Wireless Access Systems; IEEE Computer Society and the IEEE Microwave Theory and Techniquest Society; Oct. 1, 2004; 893 pages.

U.S. Appl. No. 11/085,761 "Network System for Distributing Protected Content"; Sehat Sutardia; filed Mar. 21, 2005; 69 pages.

U.S. Appl. No. 11/039,288, filed Jan. 19, 2005, Sutardja, Sehat.

Clark, Kennedy. Hamilton, Kevin. Cisco LAN Switching: Cisco Lan Switching—Google Books Result p. 267 [retreived Feb. 4, 2009] <http://books?id=BWS6EHcfU-4C&pg=PA267&lpg=PA267&dq=cisco+and+single+hop+period&source=bl&ots=F4wFUh4Egi&sig=v3ZBdYkKpYfd6MXGXmcfcLI--2k&hl=en&sa=X&oibook_result&resnum=6&ct=result>.

Communication from the European Patent Office dated Apr. 6, 2006 for Application No. 06002269.6.

Communication from the European Patent Office dated Apr. 6, 2006 for Application No. 06002265.4.

Communication from the European Patent Office dated Apr. 6, 2006 for Application No. 06002246.4.

Corrected Version of the Written Opinion from the Intellectual Property Office of Singapore dated Mar. 16, 2007 for Application No. SG200600824-7; 4 pages.

Deal, Richard. CCNA Cisco Certified Network Associate Study Guide (Exam 640-801) Google Book Result. Chapter 10 p. 444 [retreieved Feb. 4, 2009]. <http://books?id=ETz0H0uPc0C&pg=RA2-PA444&lpg-RA2-PA444&dq=cisco+and+2+hop+period&source=web&ots=9Bjbxlq9tV&sig=HDUfD5FsL83j_A0jKDnv42jaXLI&hl=en&sa=X&oibook_result&resnum=9&ct=result>.

First Official Communication from the European Patent Office dated May 29, 2007 for Application No. 06 002 246.4-1245; 9 pages.

First Official Communication from the European Patent Office dated May 29, 2007 for Application No. 06 002 269.6-1245; 8 pages.

First Official Communication from the European Patent Office dated May 29, 2007 for Application No. 06 002 265.4-1245; 8 pages.

(56) References Cited

OTHER PUBLICATIONS

Notification of Transmittal of the International Search Report dated Jul. 17, 2006 for International Application No. PCT/US2006/010474; 6 pages.

PCT Notification of Transmittal of the International Search Report and the Written Opinion of the International Searching Authority dated Sep. 19, 2007 for Application No. PCT/US2007/006906; 12 pages.

Rallu, F. et al, "Acid- and Multistress-Resistant Mutants of *Lactococcus Lactis*:—Identification of Intracellular Stress Signals," Molecular Microbiology, 2000, pp. 517-528.

Written Opinion and Search Report from the Intellectual Property Office of Singapore dated Mar. 22, 2007 for Application No. SG 200600827-0; 10 pages.

Written Opinion and Search Report from the Intellectual Property Office of Singapore dated Mar. 2007 for Application No. SG 200600824-7; 8 pages.

Written Opinion and Search Report from the Intellectual Property Office of Signapore dated Mar. 16, 2007 for Application No. SG 200600826-2; 9 pages.

Written Opinion of the International Searching Authority dated Jul. 17, 2006 for International Application No. PCT/US2006/010474; 5 pages.

\* cited by examiner

METHOD AND APPARATUS FOR LOCATING A WLAN STATION BASED ON A PROPAGATION DELAY OF A SIGNAL

CROSS-REFERENCE TO RELATED APPLICATIONS

The present disclosure is a continuation of U.S. patent application Ser. No. 13/204,262 (now U.S. Pat. No. 8,355,739), filed on Aug. 5, 2011, which is a continuation of U.S. application Ser. No. 13/013,500 (now U.S. Pat. No. 7,996,020), filed on Jan. 25, 2011, which is a continuation of U.S. application Ser. No. 12/006,085 (now U.S. Pat. No. 7,877,101), filed Dec. 28, 2007, which claims the benefit of U.S. Provisional Application No. 60/882,246, filed on Dec. 28, 2006. The entire disclosures of the applications referenced above are incorporated herein by reference.

The application relates to U.S. patent application Ser. No. 11/085,761, filed on Mar. 21, 2005. The disclosure of the above application is incorporated herein by reference in its entirety.

FIELD

The present disclosure relates to wireless networks, and more particularly to locating a client station of a wireless network using signal propagation delay.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

IEEE standards 802.11, 802.11a, 802.11b, 802.11g, 802.11h, 802.11n, 802.16, and 802.20, which are hereby incorporated by reference in their entirety, define several different standards for configuring wireless networks and devices. According to these standards, wireless network devices may be operated in either an infrastructure mode or an ad-hoc mode. In the infrastructure mode, wireless network devices of client stations communicate with each other through a wireless network device of an access point (AP). In the ad-hoc mode, wireless network devices of client stations communicate directly with each other and do not employ a wireless network device of an access point. The term client station, or mobile station, may not necessarily mean that a wireless network device is actually mobile. For example, a desktop computer that is not mobile may incorporate a wireless network device and operate as a client station or a mobile station.

Certain performance and/or security functions of a wireless network device may depend on location of the wireless network device (either an access point or a client station) with respect to other wireless network devices. For example, an access point may impose restraints on a client station when the client station is outside certain physical boundaries (e.g., for security purposes). The access point may provide the client station location-specific services, and/or the client station may provide its location for roaming decisions, maps, and points of interest.

SUMMARY

A wireless network device including: a first RF transceiver module configured to (i) for a predetermined number of times, transmit a data frame to a second RF transceiver module, and (ii) for each data frame transmitted to the second RF transceiver module, receive an acknowledgement frame from the second RF transceiver module after a respective delay period; a timing module configured to generate a timer value corresponding to an accumulated delay period, wherein the accumulated delay period corresponds to each of the respective delay periods; and a control module configured to (i) determine the predetermined number of times that the first RF transceiver transmitted the data frame to the second RF transceiver based on a resolution of the timing module, and, (ii) determine an actual delay period based on (a) the timer value and (b) the predetermined number of times.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF DRAWINGS

The present invention will become more fully understood from the detailed description and the accompanying drawings, wherein.

DESCRIPTION

Figure 1:
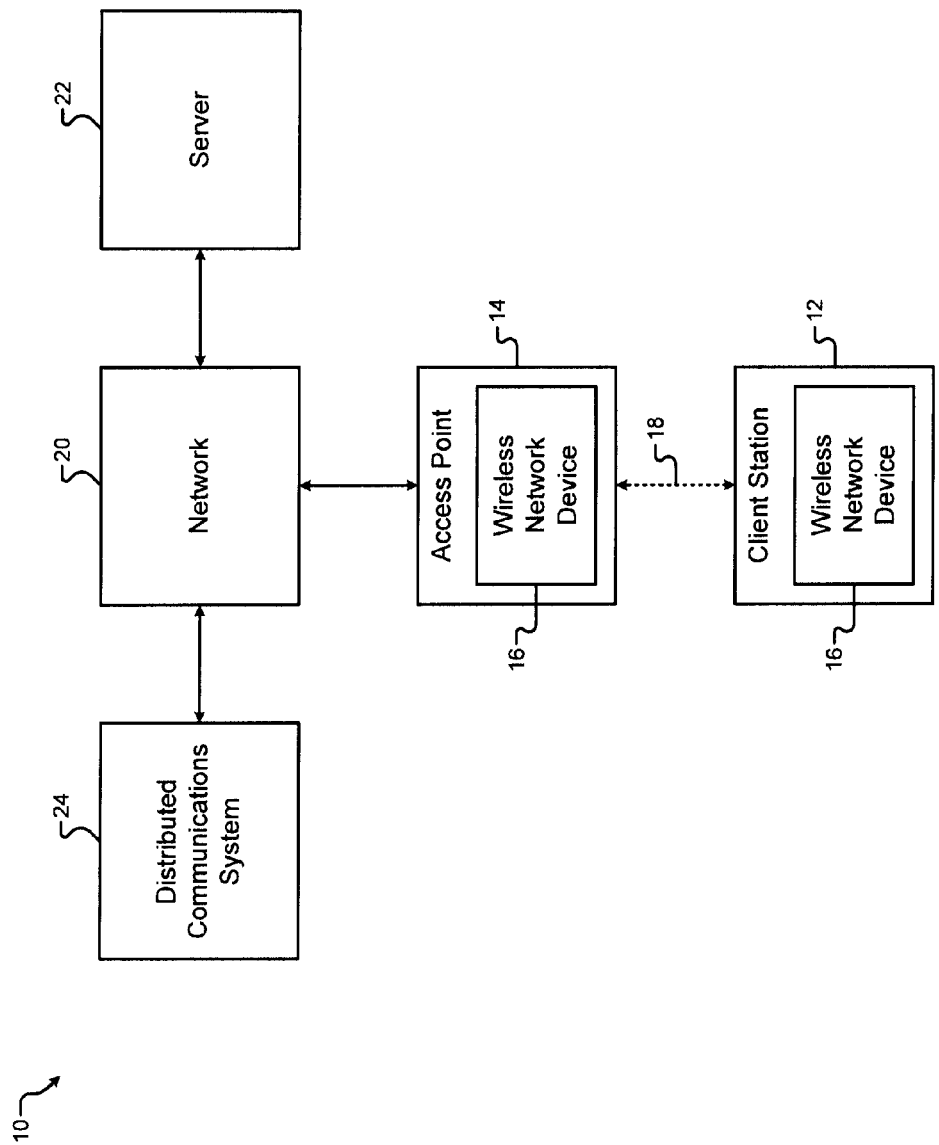
FIG. 1 is a functional block diagram of an exemplary wireless network that is configured in an infrastructure mode and that includes one or more client stations and one or more access points (AP) according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

To locate a wireless network device of a wireless network, the wireless network device according to the present disclosure uses signal propagation delay. A wireless network operating in either an infrastructure mode or an ad hoc mode may implement the wireless network device as described herein.

Referring now to FIG. 1, an exemplary wireless network 10 is shown in an infrastructure mode as defined by IEEE 802.11 and other future wireless standards. The wireless network 10 includes one or more client stations 12 and one or more access points (AP) 14. Each of the client station 12 and the AP 14 includes a wireless network device 16. The client station 12 and the AP 14 transmit and receive wireless signals 18.

The AP 14 is a node in a network 20. The network 20 may be a local area network, a wide area network, or another network configuration. The network 20 may include other nodes such as a server 22 and may be connected to a distributed communications system 24, such as the Internet.

Figure 2:
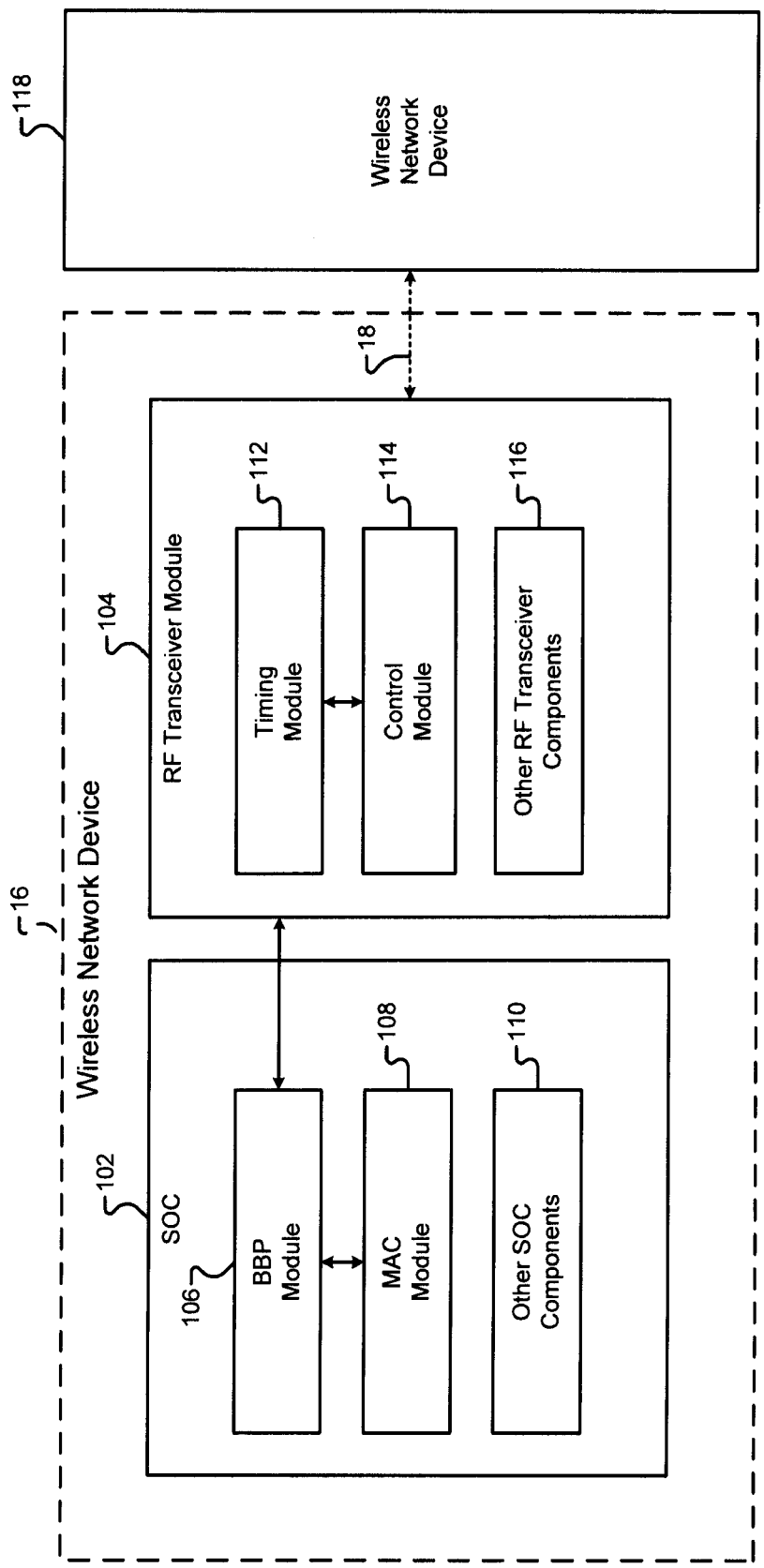
FIG. 2 is a functional block diagram of an exemplary wireless network device of either the client stations or the AP's according to the present disclosure.

Referring now to FIG. 2, the wireless network device 16 (e.g., of either the client station 12 or the AP 14) is shown. The wireless network device 16 includes a system on chip (SOC) 102 and a radio frequency (RF) transceiver module 104. The SOC 102 includes a baseband processor (BBP) module 106, a media access control (MAC) module 108, and other SOC components, identified collectively at 110, including interfaces, memory and/or processors. The RF transceiver module 104 and the BBP module 106 communicate with the MAC module 108.

The RF transceiver module 104 receives the wireless signals 18. The BBP module 106 receives the wireless signals 18 from the RF transceiver module 104 and converts the wireless signals 18 from analog signals to digital signals. The BBP module 106 demodulates the digital signals. The MAC module 108 receives the demodulated digital signals.

The MAC module 108 sends data signals to the BBP module 106. The BBP module 106 converts the data signals from digital signals to analog signals and modulates the analog signals. The RF transceiver module 104 receives the analog modulated signals and transmits the modulated analog signals as the wireless signals 18.

The RF transceiver module 104 includes a timing module 112, a control module 114, and other RF transceiver components, identified collectively at 116, including receivers, transmitters, and other standard components. The timing module 112 and the control module 114 may be located within the RF transceiver module 104 or at other locations, such as within the MAC module 108, for example. The RF transceiver module 104 transmits and receives the wireless signals 18 to and from an RF transceiver module of another wireless network device 118. The control module 114 determines a signal propagation delay between the RF transceiver module 104 and the wireless network device 118 based on a period elapsed during transmission and reception of the wireless signals 18. The control module 114 determines a location of the wireless network device 16 based on the signal propagation delay as described herein in more detail.

The RF transceiver module 104 starts a transmission sequence when the RF transceiver module 104 starts to transmit the data frame to the wireless network device 118, and the timing module 112 increments accordingly. For example, the timing module 112 may include a timer that is initialized to zero and begins to increment when the RF transceiver module 104 starts the transmission sequence. The timing module 112 generates a timer value based on the timer. For example only, the data frame may be an 802.11 null data frame. For example only, the data frame may be transmitted and received at a data rate of 54 megabit per second and may be of any predetermined frame length.

The wireless network device 118 receives the data frame after a delay period and a predetermined data receiving period. The delay period is a period elapsed from when the RF transceiver module 104 starts to transmit the data frame to when the wireless network device 118 starts to receive the data frame. The data receiving period is a period elapsed from when the wireless network device 118 starts to receive the data frame to when the wireless network device 118 finishes receiving the data frame. The wireless network device 118 is assigned a predetermined short inter-frame space (SIFS) period that measures a period since the wireless network device 118 becomes free (e.g., is not receiving or transmitting frames). The wireless network device 118 waits the SIFS period after receiving the data frame before starting to transmit an acknowledgment (ACK) frame to the RF transceiver module 104.

The RF transceiver module 104 receives the ACK frame after a predetermined ACK transmitting period and the delay period. The ACK transmitting period is a period elapsed from when the wireless network device 118 starts to transmit the ACK frame to when the wireless network device 118 finishes transmitting the ACK frame. The delay period is a period elapsed from when the wireless network device 118 finishes transmitting the ACK frame to when the RF transceiver module 104 finishes receiving the ACK frame. The RF transceiver module 104 is assigned the SIFS period that measures a period since the RF transceiver module 104 becomes free. The RF transceiver module 104 waits the SIFS period after receiving the ACK frame before starting to transmit another data frame. The control module 114 ends the transmission sequence after the RF transceiver module 104 waits the SIFS period.

The delay period is an unknown length of period based on the data receiving period, the SIFS period, and the ACK transmitting period. To determine the delay period, the control module 114 determines a sequence period based on the timer value when the transmission sequence is completed. The control module 114 determines the delay period based on the sequence period, the data receiving period, the SIFS period, and the ACK transmitting period. A delay period Delay is determined according to the following equation:

$$\text{Delay} = \frac{t_{seq} - \text{Data} - ACK - 2*SIFS}{2}, \quad (1)$$

where $t_{seq}$ is the sequence period, Data is the data receiving period, ACK is the ACK transmitting period, and SIFS is the SIFS period.

Accuracy of the delay period based on the sequence period may be limited by a resolution of the timing module 112. For example, when the RF transceiver module 104 is 1 meter (m) away from the wireless network device 118, the delay period may be approximately 3.3 nanoseconds (ns). However, if the timing module 112 has a resolution of 10 ns, the timing module 112 does not have a sufficient resolution to accurately capture delay times shorter than 10 ns.

The RF transceiver module 104 may repeat the transmission sequence to resolve inaccuracies. Repeating the transmission sequence allows the RF transceiver module 104 to accumulate the delay period and to have the accumulated delay period exceed the resolution. In addition, accumulating the delay period decreases an error of the delay period due to the resolution.

The RF transceiver module 104 repeats the transmission sequence as long as a maximum error of the delay period due to the resolution exceeds a predetermined value. To determine the maximum error, the control module 114 determines a number of times the transmission sequence is completed. The control module 114 initializes the number to zero before starting the first transmission sequence.

The control module 114 increments the number each time that the transmission sequence is completed. The control module 114 determines the maximum error based on the resolution and the number of times the transmission sequence is completed. A maximum error $\text{Error}_{max}$ is determined according to the following equation:

$$\text{Error}_{max} = \frac{Res}{n}, \qquad (2)$$

where Res is the resolution and n is the number of times the transmission sequence is completed.

For example, when the RF transceiver module 104 is 1 m away from the wireless network device 118, and the RF transceiver module 104 completes the transmission sequence four times, an accumulated delay period may be approximately 13.2 ns. If the timing module 112 has a resolution of 10 ns, the timing module 112 does have a sufficient resolution to capture the accumulated delay period. The control module 114 determines a maximum error of the delay period to be 2.5 ns. If the maximum error exceeds the predetermined value, the RF transceiver module 104 repeats the transmission sequence another period.

If the RF transceiver module 104 repeats the transmission sequence to determine the delay period, the control module 114 determines a total period based on the timer value when an nth transmission sequence is completed. The control module 114 determines the delay period based on the total period, the data receiving period, the SIFS period, the ACK transmitting period, and the number of times the transmission sequence is completed. A delay period Delay is determined according to the following equation:

$$\text{Delay} = \frac{t_{total}/n - \text{Data} - \text{ACK} - 2*SIFS}{2}, \qquad (3)$$

where $t_{total}$ is the total period. After the control module 114 determines the delay period, the control module 114 resets the timing module 112. For example, the control module 114 may reset the timer of the timing module 112 to zero when the control module 114 resets the timing module 112.

| n | Accumulated Delay Period (ns) | Accumulated Delay Period Due to Resolution (ns) | Delay (ns) | Error max (ns) |
|---|---|---|---|---|
| 2 | 16 | 10 | 5 | 5 |
| 4 | 32 | 30 | 7.5 | 2.5 |
| 8 | 64 | 60 | 7.5 | 1.25 |
| 16 | 128 | 120 | 7.5 | 0.625 |
| 32 | 256 | 250 | 7.81 | 0.3125 |
| 64 | 512 | 510 | 7.96 | 0.156 |
| 128 | 1024 | 1020 | 7.968 | 0.078 |

An exemplary table of delay times and maximum errors of the delay times are shown above. The table assumes that a delay period is 8 ns and a resolution of the timing module 112 is 10 ns. Repeating the transmission sequence allows the RF transceiver module 104 to accumulate the delay period and to have the accumulated delay period exceed the resolution of 10 ns.

However, the accumulated delay period is rounded off due to the resolution. This results in an error in the computed delay period. Further accumulating the delay period decreases the error of the computed delay period (i.e., the computed delay period is closer in value to the delay period of 8 ns). In addition, accumulating the delay period decreases the maximum error of the delay period (i.e., the maximum error is closer in value to zero).

The control module 114 may determine an error percentage of a delay period of a transmission sequence due to the resolution of the timing module 112. The control module 114 determines the error percentage based on the resolution, the number of times the transmission sequence is completed, and the delay period. An error percentage $\text{Error}_{per}$ may be determined according to the following equation:

$$|\text{Error}_{per}| \leq (Res/(n*2*\text{Delay})*100)\%. \qquad (4)$$

When the RF transceiver module 104 and the wireless network device 118 are in line-of-sight (i.e., no reflection) operation, the control module 114 determines a distance between the RF transceiver modules. The control module 114 determines the distance based on the delay period. A distance Distance is determined according to the following equation:

$$\text{Distance} = \text{Delay}*c, \qquad (5)$$

where c is the speed of light. The distance is used to locate the client station 12.

Determining the delay period based on predetermined values of the data receiving period, the SIFS period, and the ACK transmitting period may be inaccurate if hardware of the RF transceiver module 104 is inaccurate. For example only, the hardware may be inaccurate due to clock drift. To overcome inaccuracies, the data receiving period, the SIFS period, and the ACK transmitting period is calibrated for a known distance between the RF transceiver module 104 and the wireless network device 118. The control module 114 determines the delay period for unknown distances between the RF transceivers based on the calibrated values instead of the predetermined values.

In yet another implementation, the number of times the transmission sequence is completed is calibrated for the known distance between the RF transceiver module 104 and the wireless network device 118. For example only, the known distance may be a worse-case distance where the timing module 112 does not have a sufficient resolution to accurately capture the delay period. The number of times the transmission sequence is completed is calibrated to a value where the maximum error of the delay period due to the resolution of the timing module 112 is within acceptable limits. The control module 114 determines the delay period for unknown distances between the RF transceivers based on the calibrated value instead of determining a value. The control module 114 does not increment the number of times the transmission sequence is completed when the number is calibrated.

Figure 3:
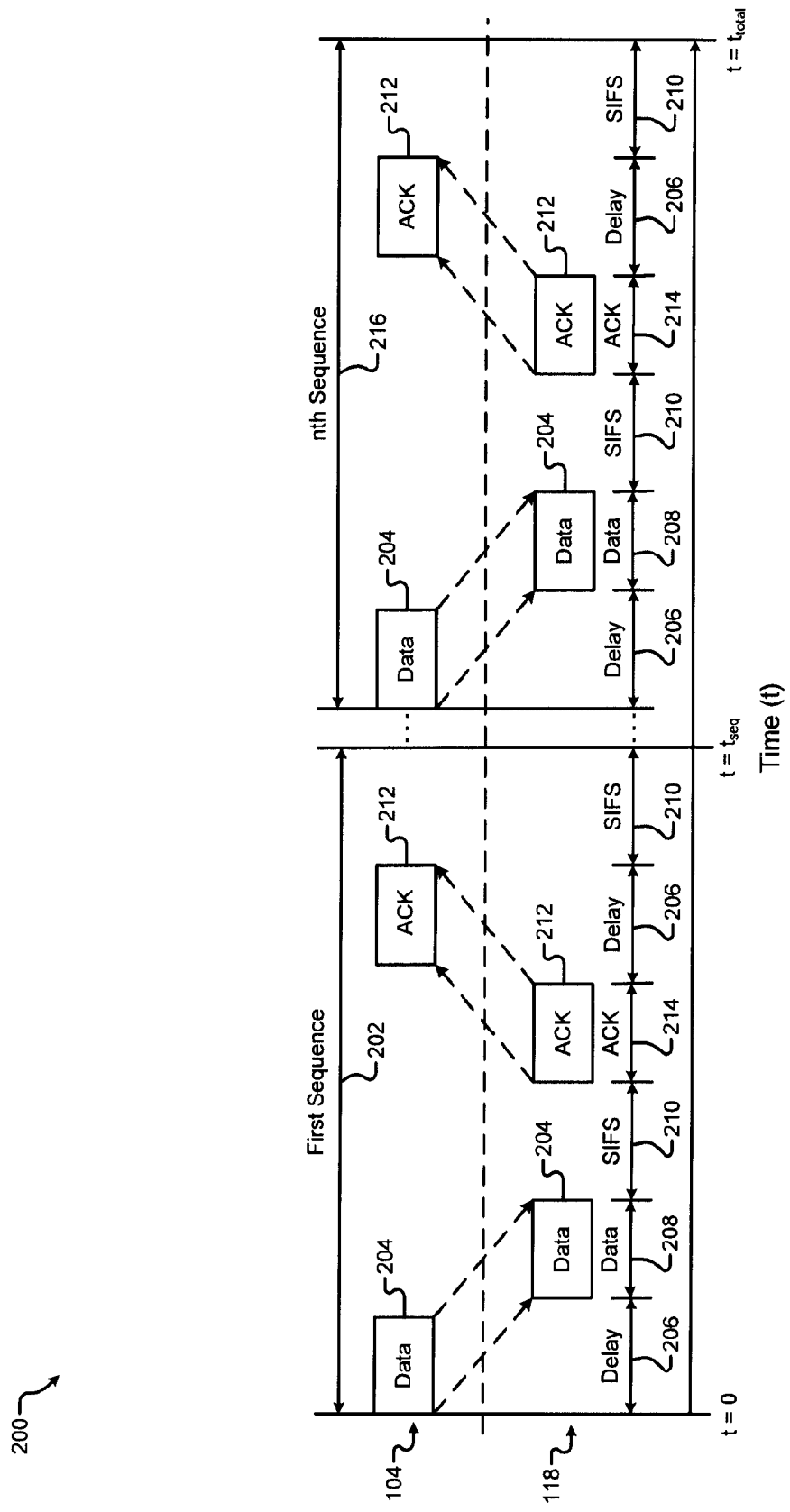
FIG. 3 is a timing diagram that illustrates exemplary transmission sequences between the wireless network device and another wireless network device according to the present disclosure.

Referring now to FIG. 3, an exemplary timing diagram 200 illustrates the transmission sequences between the RF transceiver module 104 and the wireless network device 118. The RF transceiver module 104 starts a first sequence 202 and the timing module 112 increments accordingly. The wireless network device 118 receives a data frame 204 after a delay period 206 and a data receiving period 208.

The wireless network device 118 is assigned a SIFS period 210 that measures a period since the wireless network device 118 becomes free. The wireless network device 118 waits the SIFS period 210 after receiving the data frame 204 before starting to transmit an ACK frame 212 to the RF transceiver module 104. The RF transceiver module 104 receives the ACK frame 212 after the delay period 206 and an ACK transmitting period 214.

The RF transceiver module 104 is assigned the SIFS period 210 that measures a period since the RF transceiver module 104 becomes free. The RF transceiver module 104 waits the SIFS period 210 after receiving the ACK frame 212 before starting to transmit another data frame. The control module 114 ends the first sequence 202 after the RF transceiver module 104 waits the SIFS period 210. To determine the delay period 206, the control module 114 determines the sequence period based on the timer value when the first sequence 202 is completed. The control module 114 determines the delay period 206 based on the sequence period, the data receiving period 208, the SIFS period 210, and the ACK transmitting period 214.

The RF transceiver module 104 may repeat the first sequence 202. The RF transceiver module 104 accumulates the delay period 206 as long as a maximum error of the delay period 206 due to the resolution of the timing module 112 exceeds a predetermined value. To determine the maximum error, the control module 114 determines a number of times the first sequence 202 is completed.

The control module 114 initializes the number of times the first sequence 202 is completed to zero before starting the first sequence 202. The control module 114 increments the number each time that the first sequence 202 is completed. The control module 114 determines the maximum error based on the resolution and the number of times the first sequence 202 is completed.

When the RF transceiver module 104 repeats the first sequence 202, to determine the delay period 206, the control module 114 determines the total period based on the timer value when an nth sequence 216 is completed. The control module 114 determines the delay period 206 based on the total period, the data receiving period 208, the SIFS period 210, the ACK transmitting period 214, and the number of times the first sequence 202 is completed. After the control module 114 determines the delay period, the control module 114 resets the timing module 112.

The control module 114 may determine an error percentage of a delay period of first sequence 202 due to the resolution of the timing module 112. The control module 114 may determine the error percentage based on the resolution, the number of times the first sequence 202 is completed, and the delay period 206. Assuming the RF transceiver module 104 and the wireless network device 118 are in line-of-sight (i.e., no reflection) operation, the control module 114 determines the distance between the RF transceiver modules. The control module 114 determines the distance based on the delay period 206. The distance is used to locate the client station 12.

Figure 4:
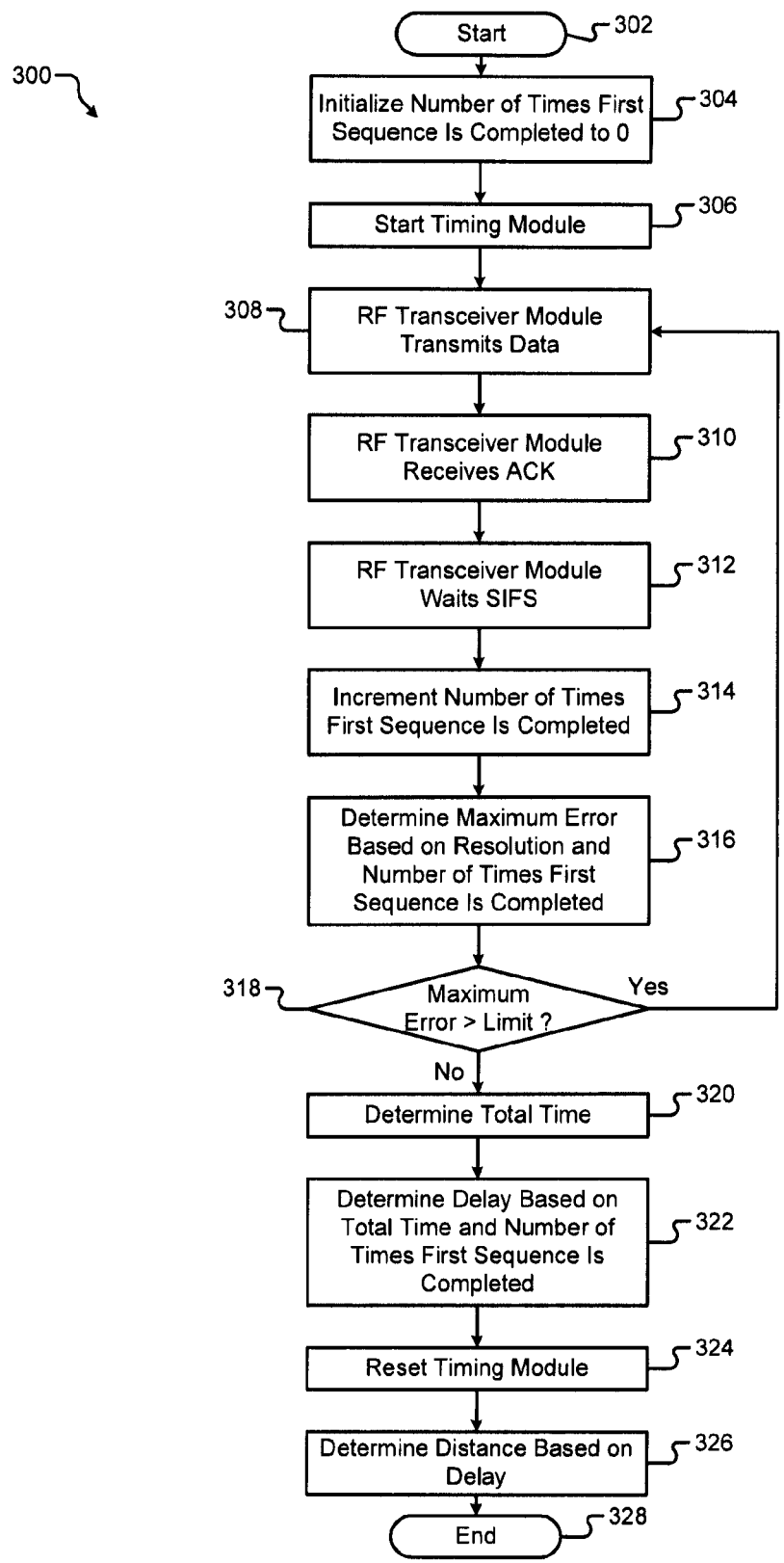
FIG. 4 is a flowchart that illustrates exemplary steps performed by a control module of the wireless network device to determine a distance between the wireless network device and another wireless network device based on signal propagation delay according to the present disclosure.

Referring now to FIG. 4, a method 300 depicts exemplary steps performed by the control module 114 to determine the distance between the RF transceiver module 104 and the wireless network device 118 based on signal propagation delay (the delay period 206). Control starts in step 302. In step 304, the number of times the first sequence 202 is completed is initialized to zero.

In step 306, the timing module 112 is started. In step 308, the RF transceiver module 104 transmits the data frame 204. In step 310, the RF transceiver module 104 receives the ACK frame 212.

In step 312, the RF transceiver module 104 waits the SIFS period 210. In step 314, the number of times the first sequence 202 is completed is incremented. In step 316, the maximum error of the delay period 206 due to the resolution of the timing module 112 is determined based on the resolution and the number of times the first sequence 202 is completed.

In step 318, control determines whether the maximum error is greater than a limit value (the predetermined value). If true, control continues in step 308. If false, control continues in step 320.

In step 320, the total period is determined. In step 322, the delay period 206 is determined based on the total period and the number of times the first sequence 202 is completed. In step 324, the timing module 112 is reset. In step 326, where the distance between the RF transceiver module 104 and the wireless network device 118 is determined based on the delay period 206. Control ends in step 328.

Figure 5:
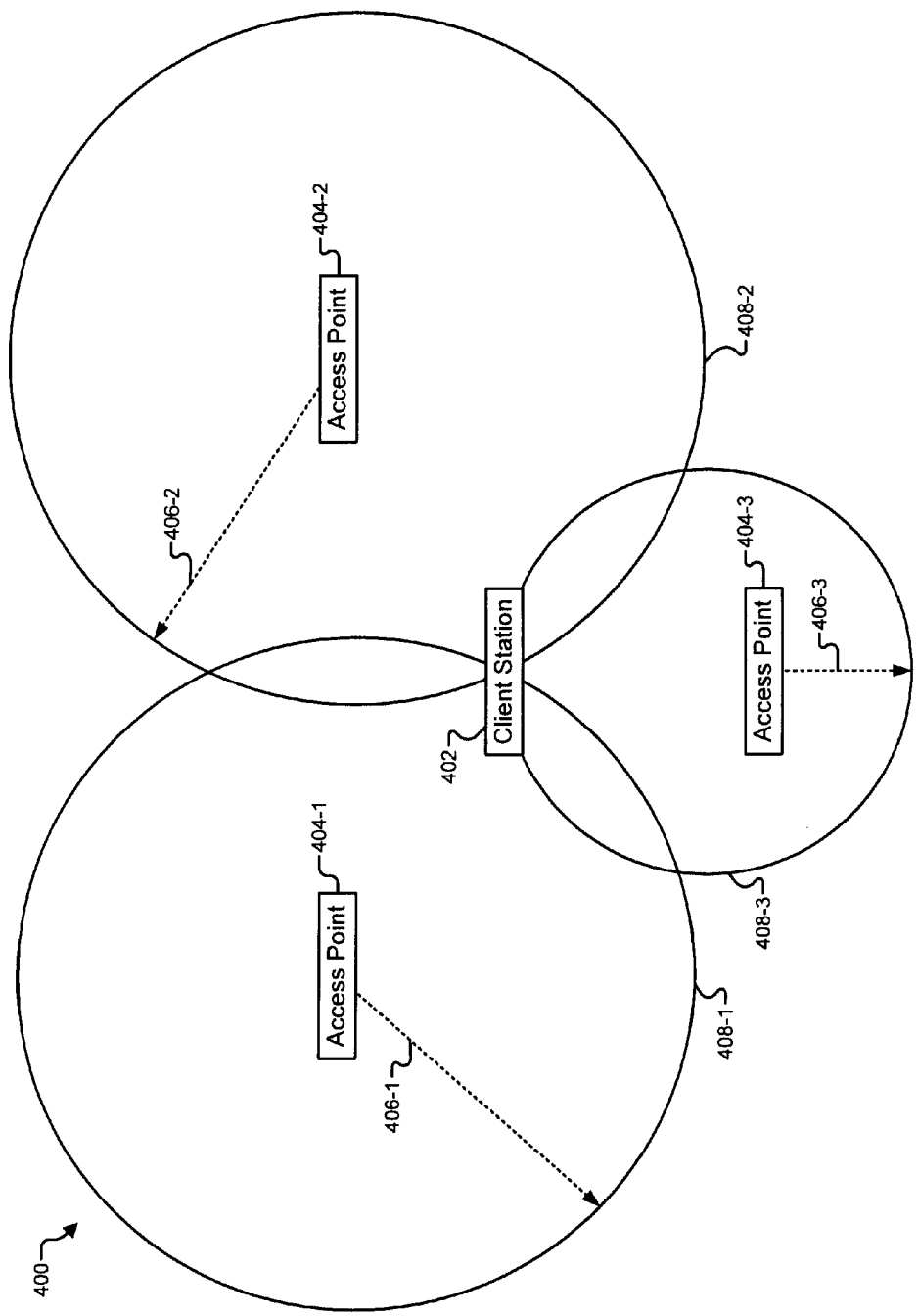
FIG. 5 is a functional block diagram of an exemplary wireless network that locates a client station using signal propagation delay according to the present disclosure.

Referring now to FIG. 5, an exemplary wireless network 400 is shown. The wireless network 400 includes a client station 402 and access points 404-1, 404-2, and 404-3 (referred to collectively as access points 404). The client station 402 uses signal propagation delay (a delay period) to locate itself.

The access points 404 each broadcasts their coordinates as an information element in 802.11 beacons and probe responses. For example only, the coordinates of each of the access points 404 may be configured based on their own respective coordinate systems. Alternatively, for example only, the coordinates of the access points 404 may be determined based on the Global Positioning System (i.e., longitude/latitude). For example only, the access points 404 may each broadcast their coordinates every 100 milliseconds.

The client station 402 receives the coordinates of the access points 404. The client station 402 determines a distance 406-1 between the client station 402 and the access point 404-1 as described in FIG. 2. The client station 402 determines its location to be on a circle 408-1 centered at the coordinates of the access point 404-1 with a radius equal to the distance 406-1.

The client station 402 determines a distance 406-2 between the client station 402 and the access point 404-2 as described in FIG. 2. The client station 402 determines its location to be on a circle 408-2 centered at the coordinates of the access point 404-2 with a radius equal to the distance 406-2. The client station 402 determines a distance 406-3 between the client station 402 and the access point 404-3 as described in FIG. 2. The client station 402 determines its location to be on a circle 408-3 centered at the coordinates of the access point 404-3 with a radius equal to the distance 406-3.

The client station 402 determines its exact location to be an intersection of the circles 408-1, 408-2, and 408-3 (referred to collectively as circles 408). Alternatively, in another implementation, the one of the access points 404 determines the distances 406-1, 406-2, and 406-3 and determines the locations of the client station 402 to be on the circles 408. One of the access points 404 determines the exact location of the client station 402 to be the intersection of the circles 408. In other words, either the client station 402 or one of the access points 404 may determine the exact location of the client station 402 using signal propagation delay.

Figure 6:
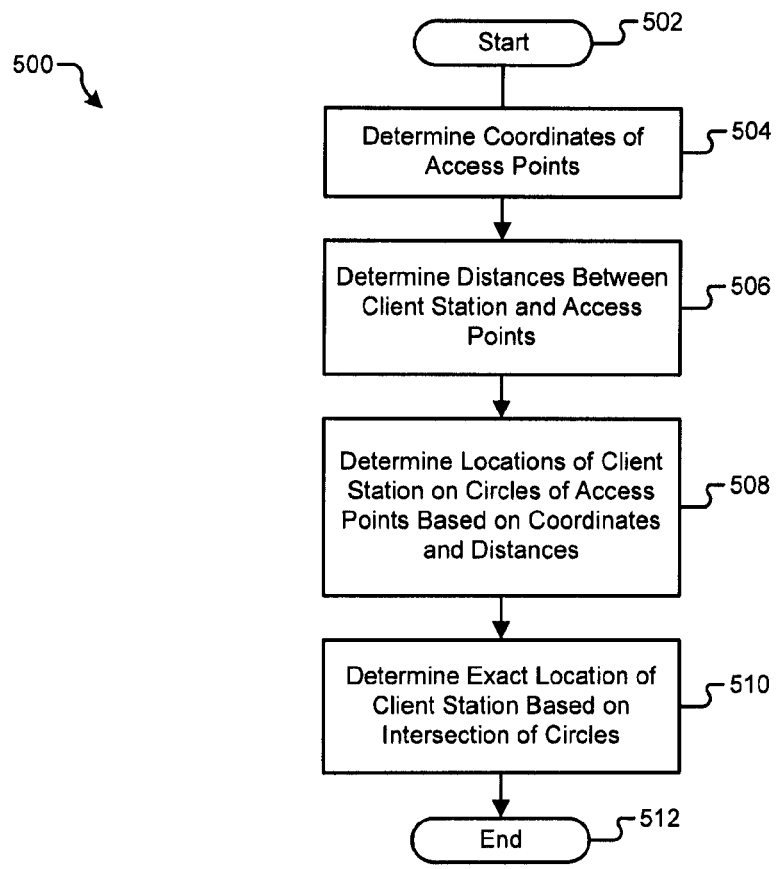
FIG. 6 is a flowchart that illustrates exemplary steps performed by the control module of the wireless network device to locate the client station using signal propagation delay according to the present disclosure.

Referring now to FIG. 6, a method 500 depicts exemplary steps performed by the control module 114 to locate the client station 402 using signal propagation delay. Control starts in step 502. In step 504, the coordinates of the access points 404 are determined.

In step 506, the distances 406 are determined. In step 508, the locations of the client station 402 on the circles 408 are determined based on the coordinates of the access points 404 and the distances 406. In step 510, the exact location of the client station 402 is determined based on the intersection of the circles 408. Control ends in step 512.

Figure 7A:
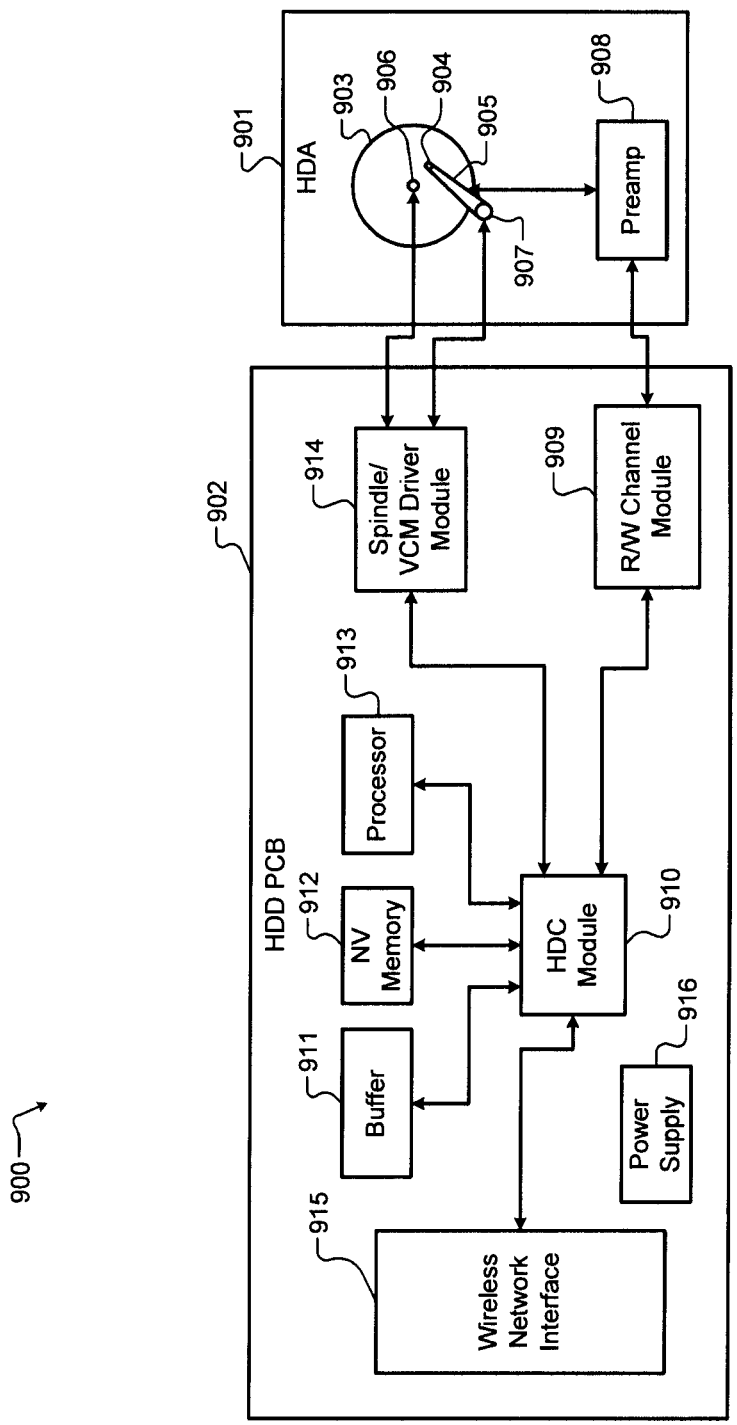
FIG. 7A is a functional block diagram of a hard disk drive.

Referring now to FIGS. 7A-7G, various exemplary implementations incorporating the teachings of the present disclosure are shown. Referring now to FIG. 7A, the teachings of the disclosure can be implemented in a wireless network interface 915 of a hard disk drive (HDD) 900. The HDD 900 includes a hard disk assembly (HDA) 901 and an HDD printed circuit board (PCB) 902. The HDA 901 may include a magnetic medium 903, such as one or more platters that store data, and a read/write device 904. The read/write device 904 may be arranged on an actuator arm 905 and may read and write data on the magnetic medium 903. Additionally, the HDA 901 includes a spindle motor 906 that rotates the magnetic medium 903 and a voice-coil motor (VCM) 907 that actuates the actuator arm 905. A preamplifier device 908 amplifies signals generated by the read/write device 904 during read operations and provides signals to the read/write device 904 during write operations.

The HDD PCB 902 includes a read/write channel module (hereinafter, "read channel") 909, a hard disk controller (HDC) module 910, a buffer 911, nonvolatile memory 912, a processor 913, and a spindle/VCM driver module 914. The read channel 909 processes data received from and transmitted to the preamplifier device 908. The HDC module 910 controls components of the HDA 901 and communicates with an external device (not shown) via the wireless network interface 915. The external device may include a computer, a multimedia device, a mobile computing device, etc. The wireless network interface 915 may include wireless communication links.

The HDC module 910 may receive data from the HDA 901, the read channel 909, the buffer 911, nonvolatile memory 912, the processor 913, the spindle/VCM driver module 914, and/or the wireless network interface 915. The processor 913 may process the data, including encoding, decoding, filtering, and/or formatting. The processed data may be output to the HDA 901, the read channel 909, the buffer 911, nonvolatile memory 912, the processor 913, the spindle/VCM driver module 914, and/or the wireless network interface 915.

The HDC module 910 may use the buffer 911 and/or nonvolatile memory 912 to store data related to the control and operation of the HDD 900. The buffer 911 may include DRAM, SDRAM, etc. Nonvolatile memory 912 may include any suitable type of semiconductor or solid-state memory, such as flash memory (including NAND and NOR flash memory), phase change memory, magnetic RAM, and multi-state memory, in which each memory cell has more than two states. The spindle/VCM driver module 914 controls the spindle motor 906 and the VCM 907. The HDD PCB 902 includes a power supply 916 that provides power to the components of the HDD 900.

Figure 7B:
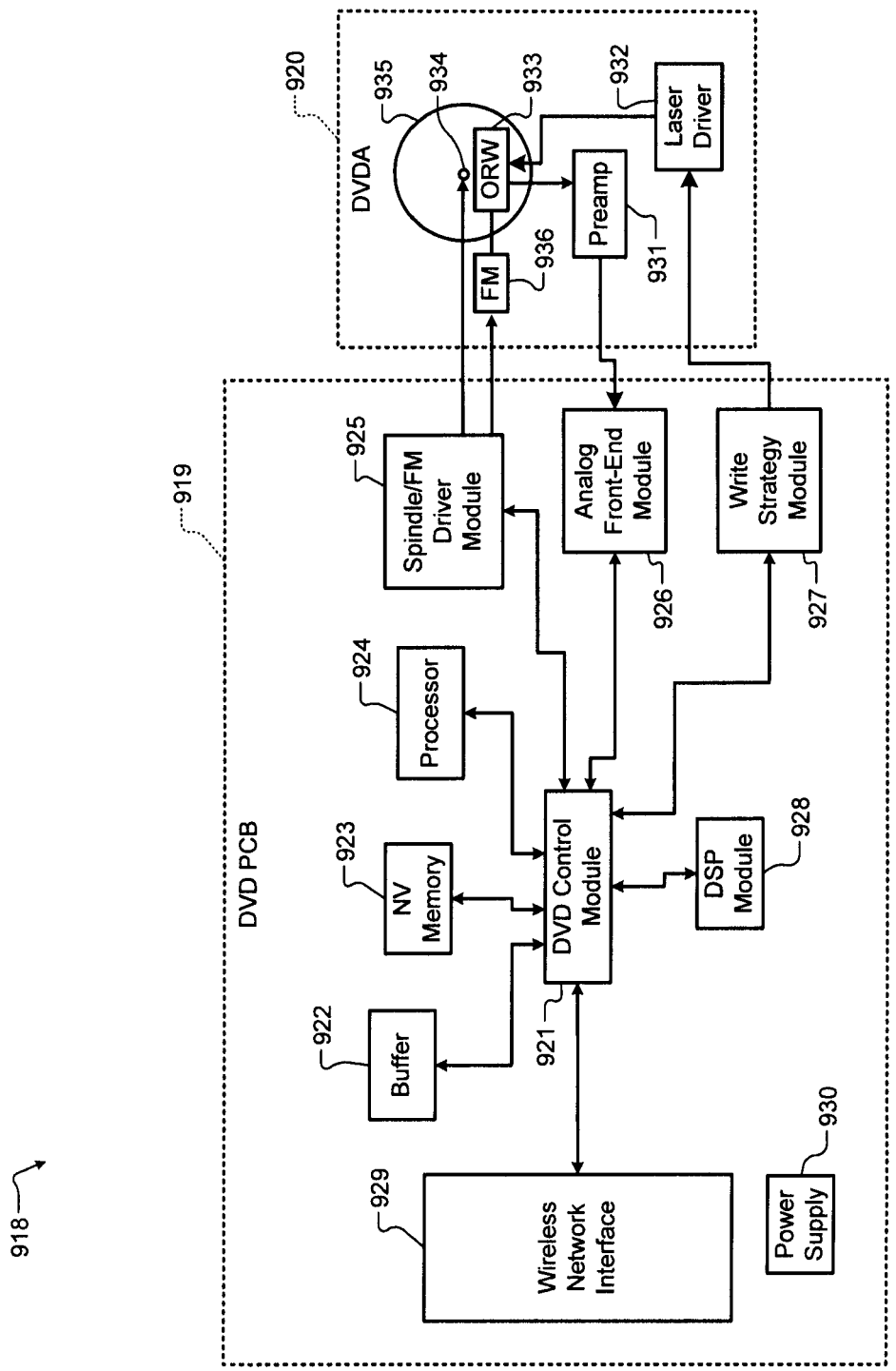
FIG. 7B is a functional block diagram of a DVD drive.

Referring now to FIG. 7B, the teachings of the disclosure can be implemented in a wireless network interface 929 of a DVD drive 918 or of a CD drive (not shown). The DVD drive 918 includes a DVD PCB 919 and a DVD assembly (DVDA) 920. The DVD PCB 919 includes a DVD control module 921, a buffer 922, nonvolatile memory 923, a processor 924, a spindle/FM (feed motor) driver module 925, an analog front-end module 926, a write strategy module 927, and a DSP module 928.

The DVD control module 921 controls components of the DVDA 920 and communicates with an external device (not shown) via the wireless network interface 929. The external device may include a computer, a multimedia device, a mobile computing device, etc. The wireless network interface 929 may include wireless communication links.

The DVD control module 921 may receive data from the buffer 922, nonvolatile memory 923, the processor 924, the spindle/FM driver module 925, the analog front-end module 926, the write strategy module 927, the DSP module 928, and/or the wireless network interface 929. The processor 924 may process the data, including encoding, decoding, filtering, and/or formatting. The DSP module 928 performs signal processing, such as video and/or audio coding/decoding. The processed data may be output to the buffer 922, nonvolatile memory 923, the processor 924, the spindle/FM driver module 925, the analog front-end module 926, the write strategy module 927, the DSP module 928, and/or the wireless network interface 929.

The DVD control module 921 may use the buffer 922 and/or nonvolatile memory 923 to store data related to the control and operation of the DVD drive 918. The buffer 922 may include DRAM, SDRAM, etc. Nonvolatile memory 923 may include any suitable type of semiconductor or solid-state memory, such as flash memory (including NAND and NOR flash memory), phase change memory, magnetic RAM, and multi-state memory, in which each memory cell has more than two states. The DVD PCB 919 includes a power supply 930 that provides power to the components of the DVD drive 918.

The DVDA 920 may include a preamplifier device 931, a laser driver 932, and an optical device 933, which may be an optical read/write (ORW) device or an optical read-only (OR) device. A spindle motor 934 rotates an optical storage medium 935, and a feed motor 936 actuates the optical device 933 relative to the optical storage medium 935.

When reading data from the optical storage medium 935, the laser driver provides a read power to the optical device 933. The optical device 933 detects data from the optical storage medium 935, and transmits the data to the preamplifier device 931. The analog front-end module 926 receives data from the preamplifier device 931 and performs such functions as filtering and A/D conversion. To write to the optical storage medium 935, the write strategy module 927 transmits power level and timing data to the laser driver 932. The laser driver 932 controls the optical device 933 to write data to the optical storage medium 935.

Figure 7D:
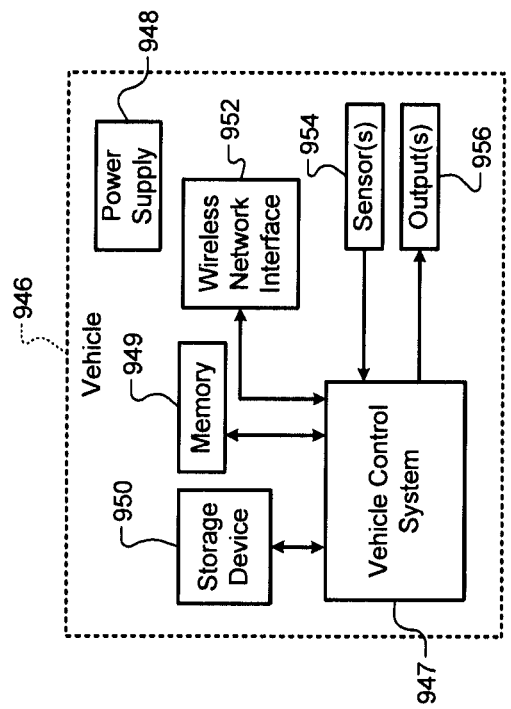
FIG. 7D is a functional block diagram of a vehicle control system.
Figure 7C:
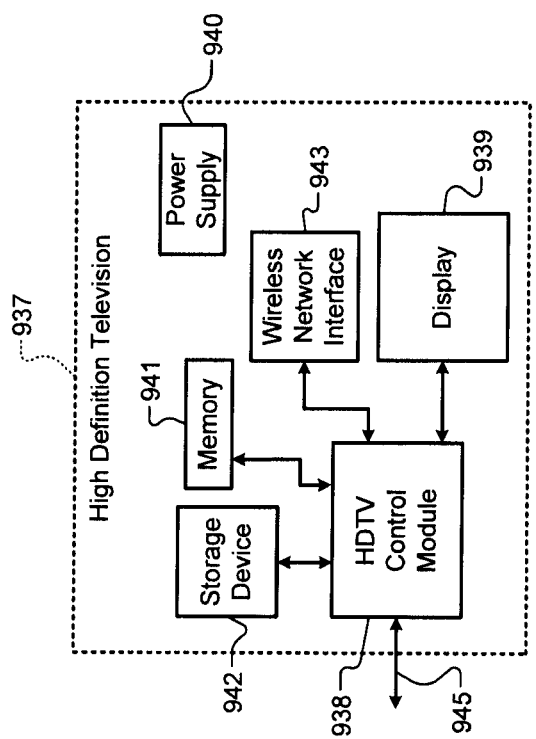
FIG. 7C is a functional block diagram of a high definition television.

Referring now to FIG. 7C, the teachings of the disclosure can be implemented in a wireless network interface 943 of a high definition television (HDTV) 937. The HDTV 937 includes an HDTV control module 938, a display 939, a power supply 940, memory 941, a storage device 942, the wireless network interface 943, and an external interface 945. An antenna (not shown) may be included.

The HDTV 937 can receive input signals from the wireless network interface 943 and/or the external interface 945, which can send and receive data via cable, broadband Internet, and/or satellite. The HDTV control module 938 may process the input signals, including encoding, decoding, filtering, and/or formatting, and generate output signals. The output signals may be communicated to one or more of the display 939, memory 941, the storage device 942, the wireless network interface 943, and the external interface 945.

Memory 941 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 942 may include an optical storage drive, such as a DVD drive, and/or a hard disk drive (HDD). The HDTV control module 938 communicates externally via the wireless network interface 943 and/or the external interface 945. The power supply 940 provides power to the components of the HDTV 937.

Referring now to FIG. 7D, the teachings of the disclosure may be implemented in a wireless network interface 952 of a vehicle 946. The vehicle 946 may include a vehicle control system 947, a power supply 948, memory 949, a storage device 950, and the wireless network interface 952. An antenna (not shown) may be included. The vehicle control system 947 may be a powertrain control system, a body control system, an entertainment control system, an anti-lock braking system (ABS), a navigation system, a telematics system, a lane departure system, an adaptive cruise control system, etc.

The vehicle control system 947 may communicate with one or more sensors 954 and generate one or more output signals 956. The sensors 954 may include temperature sensors, acceleration sensors, pressure sensors, rotational sensors, airflow sensors, etc. The output signals 956 may control engine operating parameters, transmission operating parameters, suspension parameters, etc.

The power supply 948 provides power to the components of the vehicle 946. The vehicle control system 947 may store data in memory 949 and/or the storage device 950. Memory 949 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 950 may include an optical storage drive, such as a DVD drive, and/or a hard disk drive (HDD). The vehicle control system 947 may communicate externally using the wireless network interface 952.

Figure 7F:
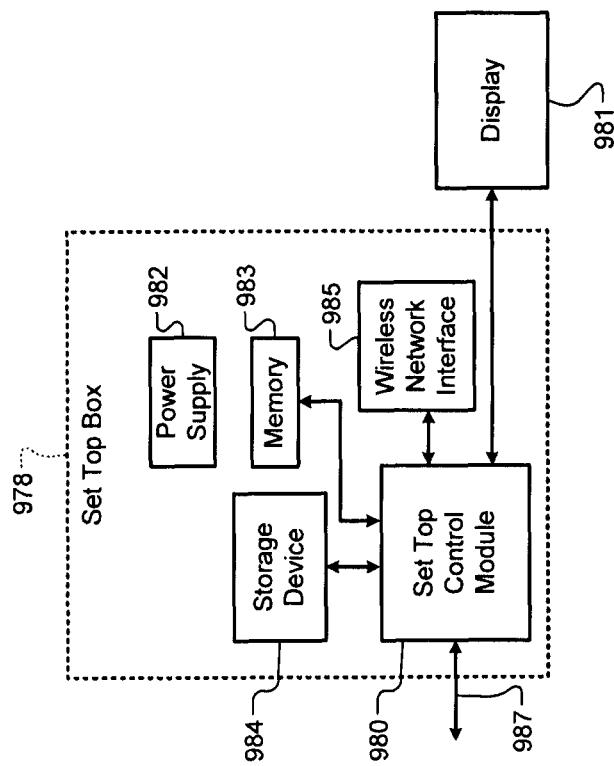
FIG. 7F is a functional block diagram of a set top box.
Figure 7E:
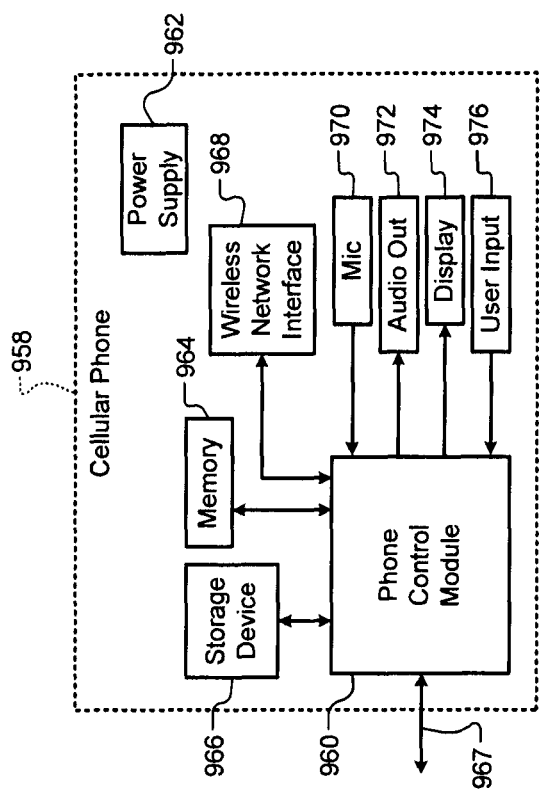
FIG. 7E is a functional block diagram of a cellular phone.

Referring now to FIG. 7E, the teachings of the disclosure can be implemented in a wireless network interface 968 of a cellular phone 958. The cellular phone 958 includes a phone control module 960, a power supply 962, memory 964, a storage device 966, and a cellular network interface 967. The cellular phone 958 may include the wireless network interface 968, a microphone 970, an audio output 972 such as a speaker and/or output jack, a display 974, and a user input device 976 such as a keypad and/or pointing device. An antenna (not shown) may be included.

The phone control module 960 may receive input signals from the cellular network interface 967, the wireless network interface 968, the microphone 970, and/or the user input device 976. The phone control module 960 may process signals, including encoding, decoding, filtering, and/or formatting, and generate output signals. The output signals may be communicated to one or more of memory 964, the storage device 966, the cellular network interface 967, the wireless network interface 968, and the audio output 972.

Memory 964 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 966 may include an optical storage drive, such as a DVD drive, and/or a hard disk drive (HDD). The power supply 962 provides power to the components of the cellular phone 958.

Referring now to FIG. 7F, the teachings of the disclosure can be implemented in a wireless network interface 985 of a set top box 978. The set top box 978 includes a set top control module 980, a display 981, a power supply 982, memory 983, a storage device 984, and the wireless network interface 985. An antenna (not shown) may be included.

The set top control module 980 may receive input signals from the wireless network interface 985 and an external interface 987, which can send and receive data via cable, broadband Internet, and/or satellite. The set top control module 980 may process signals, including encoding, decoding, filtering, and/or formatting, and generate output signals. The output signals may include audio and/or video signals in standard and/or high definition formats. The output signals may be communicated to the wireless network interface 985 and/or to the display 981. The display 981 may include a television, a projector, and/or a monitor.

The power supply 982 provides power to the components of the set top box 978. Memory 983 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 984 may include an optical storage drive, such as a DVD drive, and/or a hard disk drive (HDD).

Figure 7G:
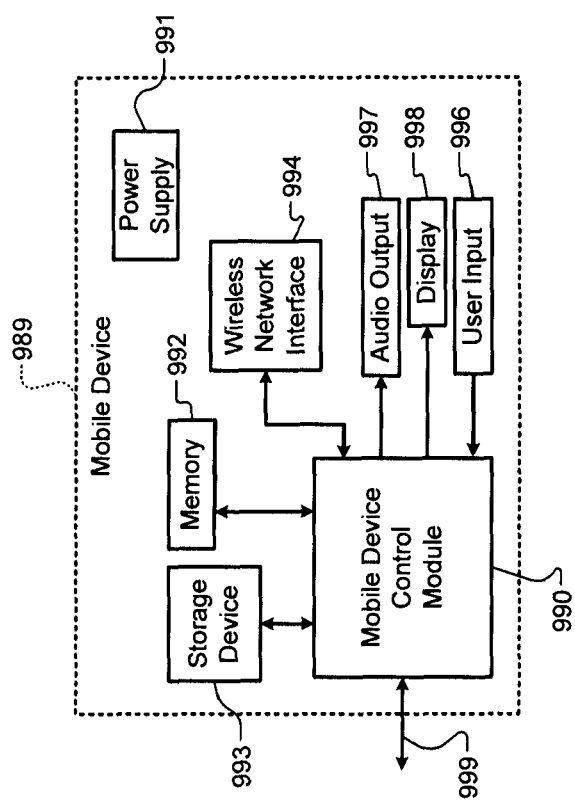
FIG. 7G is a functional block diagram of a mobile device.

Referring now to FIG. 7G, the teachings of the disclosure can be implemented in a wireless network interface 994 of a mobile device 989. The mobile device 989 may include a mobile device control module 990, a power supply 991, memory 992, a storage device 993, the wireless network interface 994, and an external interface 999. An antenna (not shown) may be included.

The mobile device control module 990 may receive input signals from the wireless network interface 994 and/or the external interface 999. The external interface 999 may include USB, infrared, and/or Ethernet. The input signals may include compressed audio and/or video, and may be compliant with the MP3 format. Additionally, the mobile device control module 990 may receive input from a user input 996 such as a keypad, touchpad, or individual buttons. The mobile device control module 990 may process input signals, including encoding, decoding, filtering, and/or formatting, and generate output signals.

The mobile device control module 990 may output audio signals to an audio output 997 and video signals to a display 998. The audio output 997 may include a speaker and/or an output jack. The display 998 may present a graphical user interface, which may include menus, icons, etc. The power supply 991 provides power to the components of the mobile device 989. Memory 992 may include random access memory (RAM) and/or nonvolatile memory.

Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 993 may include an optical storage drive, such as a DVD drive, and/or a hard disk drive (HDD). The mobile device may include a personal digital assistant, a media player, a laptop computer, a gaming console, or other mobile computing device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system, comprising:
   a first wireless network device; and
   a second wireless network device,
   wherein the first wireless network device is configured to i) transmit a data frame a first number of times, wherein the first number of times is determined based on a timing resolution associated with the first wireless network device, ii) receive a respective acknowledgement frame in response to each transmission of the data frame, iii) determine an accumulated delay period corresponding to a total time between each transmission of the data frame and reception of the respective acknowledgement frame, and iv) calculate a distance between the first wireless network device and the second wireless network device based on the accumulated delay period and the first number of times, and
   the second wireless network device is configured to i) receive each transmission of the data frame, and ii) transmit the respective acknowledgement frame in response to each transmission of the data frame.

2. The system of claim 1, wherein the first wireless network device includes a timer configured to i) start incrementing when the first wireless network device begins to transmit the data frame a first time, and ii) stop incrementing when the first wireless network device stops receiving a last one of the acknowledgment frames, and wherein the timing resolution corresponds to the timer.

3. The system of claim 1, wherein the first number of times corresponds to an accumulated delay period that is greater than the timing resolution.

4. The system of claim 1, wherein the first wireless network device is configured to i) calculate a maximum error of the accumulated delay period based on the first number of times and the timing resolution, and ii) repeat transmission of the data frame until the maximum error is greater than a predetermined value.

5. The system of claim 4, wherein the maximum error corresponds to a ratio of the timing resolution to the first number of times.

6. The system of claim 1, wherein the first wireless network device is configured to i) determine an error percentage associated with timing resolution based on the timing resolution and the first number of times, and ii) determine the distance based in part on the error percentage.

7. The system of claim 1, wherein the first wireless network device is configured to determine a location of the first wireless network device based on i) a location of the second wireless network device, and ii) the distance between the first wireless network device and the second wireless network device.

8. The system of claim 1, wherein the first wireless network device corresponds to a client station in a wireless network and the second wireless network device corresponds to an access point in the wireless network.

9. A method for determining a distance between a first wireless network device and a second wireless network device, the method comprising:
   transmitting a data frame a first number of times, wherein the first number of times is determined based on a timing resolution associated with the first wireless network device;
   receiving a respective acknowledgement frame in response to each transmission of the data frame;
   determining an accumulated delay period corresponding to a total time between each transmission of the data frame and reception of the respective acknowledgement frame; and
   calculating a distance between the first wireless network device and the second wireless network device based on the accumulated delay period and the first number of times.

10. The method of claim 9, further comprising:
    starting incrementing a timer when the first wireless network device begins to transmit the data frame a first time; and
    stopping incrementing the timer when the first wireless network device stops receiving a last one of the acknowledgment frames, wherein the timing resolution corresponds to the timer.

11. The method of claim 9, wherein the first number of times corresponds to an accumulated delay period that is greater than the timing resolution.

12. The method of claim 9, further comprising:
    calculating a maximum error of the accumulated delay period based on the first number of times and the timing resolution; and
    repeating transmission of the data frame until the maximum error is greater than a predetermined value.

13. The method of claim 12, wherein the maximum error corresponds to a ratio of the timing resolution to the first number of times.

14. The method of claim 9, further comprising:
    determining an error percentage associated with timing resolution based on the timing resolution and the first number of times; and
    determining the distance based in part on the error percentage.

15. The method of claim 9, further comprising:
    determining a location of the first wireless network device based on i) a location of the second wireless network device, and ii) the distance between the first wireless network device and the second wireless network device.

16. The method of claim 9, wherein the first wireless network device corresponds to a client station in a wireless network and the second wireless network device corresponds to an access point in the wireless network.

* * * * *